United States Patent [19]
Pall et al.

[11] Patent Number: 4,734,208
[45] Date of Patent: Mar. 29, 1988

[54] CHARGE-MODIFIED MICROFIBER FILTER SHEETS

[75] Inventors: David B. Pall, Roslyn Estates; Peter J. Degen; Irving B. Joffee, both of Huntington; Warren M. Foss, Glen Cove; Thomas C. Gsell, Levittown, all of N.Y.

[73] Assignee: Pall Corporation, Glen Cove, N.Y.

[21] Appl. No.: 716,970

[22] Filed: Mar. 28, 1985

Related U.S. Application Data

[62] Division of Ser. No. 312,723, Oct. 19, 1981, Pat. No. 4,523,995.

[51] Int. Cl.$^4$ .............................................. B01D 13/00
[52] U.S. Cl. ..................... 210/767; 210/504; 210/505; 210/509
[58] Field of Search ................................ 210/503–510, 210/654, 655, 679, 650, 767; 428/288

[56] References Cited

U.S. PATENT DOCUMENTS

4,617,128 10/1986 Ostreicher ...................... 210/504 X
4,645,567 2/1987 Hou et al. ...................... 210/504 X

Primary Examiner—Tom Wyse
Attorney, Agent, or Firm—Leydig, Voit & Mayer

[57] ABSTRACT

Filter media comprised of charge modified, resin coated inorganic microfibers are prepared by mixing inorganic microfibers with an aqueous solution of a water soluble, noncolloidal cationic thermosetting binder resin to form a dispersion, following which a precipitating agent is added to precipitate the binder resin and coat the microfibers. The coated microfibers may be used in the dispersed or suspended form as a filter aid. Preferably they are formed into a filter sheet which is then dried and cured to form a filter sheet of narrowly distributed pore size, pore sizes as small as one-half micron, and having a positive zeta potential in alkaline media. Glass is the preferred microfiber and polyamine-epichlorohydrins the preferred resins. By providing the normally negative zeta potential microfibers with a positive zeta potential the binder resins used to coat the microfibers substantially enhance particulate removal capabilities of the microfiber filter sheet.

26 Claims, 1 Drawing Figure

CHARGE-MODIFIED MICROFIBER FILTER SHEETS

This application is a division of U.S. Ser. No. 312,723, filed Oct. 19, 1981 U.S. Pat. No. 4,523,995.

TECHNICAL FIELD

The present invention relates generally to filter media, their preparation and their use in filtering fluids. More particularly, the invention relates to novel microfiber filters with greatly improved filtration efficiencies for the removal of particulates.

The function of a filter is the removal of suspended particulate material and the passage of the clarified fluid medium. A filter membrane (or filter sheet) can achieve fluid clarification by different mechanisms. Particulate material can be removed through mechanical sieving wherein all particles larger than the pore diameter of the filter sheet are removed from the fluid. With this mechanism, filtration efficiency is controlled by the relative size of the contaminant and filter pore diameter. The efficient removal of very small particles, e.g., less than 0.1 micrometer in diameter, therefore requires filter media with very small pore sizes for removal by mechanical sieving. Such finely pored filter sheets tend to have the undesirable characteristics of high pressure drop across the filter sheet, reduced dirt capacity and shorter filter life.

A filter may also remove suspended particulate material by adsorption onto the filter surfaces. Removal of particulate material by this mechanism is controlled by the surface characteristics of (1) the suspended particulate material, and (2) the filter medium. Most suspended solids which are commonly subjected to removal by filtration are negatively charged in aqueous systems near neutral pH. This feature has been long recognized in water treatment processes where oppositely charged, cationic flocculating agents are employed to improve settling efficiencies during water clarification.

Colloidal stability theory is used to predict the interaction of electrostatically charged particles and surfaces. If the charges of a particle and the filter sheet surface are of like sign and with zeta potentials of greater than about 20 mV, mutual repulsive forces will be sufficiently strong to prevent capture by adsorption. If the zeta potentials of the suspended particles and the filter surface are small, or more desirably of opposite sign, the particles will tend to adhere to the filter pore surface with high capture efficiency. Thus, filter sheets or membranes characterized by positive zeta potentials are capable of removing, by electrostatic capture, particles much smaller than the pores of the filter.

Attempts have previously been made to charge modify glass microfibers, normally having a negative zeta potential, and, with the aid of cellulose fibers, convert them into filter media. While these charge-modified glass microfiber-containing filter sheets have demonstrated improved filtering characteristics, the filter sheets and their method of preparation have certain undesirable characteristics. The charge modification processes of some of these previous attempts utilized a resin in colloid form. Using this form of resin typically requires careful preparation and aging prior to use and may present difficulties in obtaining consistent treatment of the glass microfibers due to the variation in colloid particle size of the treating solution. It is also suspected that charge modification by means of a resin in colloid form is self-limiting in the sense that the amount of resin which can be deposited on the glass microfiber surfaces may be limited. This is believed due to the nature of colloid deposition which may cease abruptly after monolayer colloid coverage of the glass surface due to mutual charge repulsion of colloid particles.

In addition to good particle capture characteristics, filter sheets must also combine mechanical strength with the ability to withstand high differential pressure loadings without fracturing or otherwise mechanically failing.

Previous attempts to prepare surface charge modified glass microfiber filter media have employed large proportions of self bonding cellulose fibers as a matrix for the charge modified glass microfibers. The presence of substantial quantities of these large diameter fibers, apparently required to provide mechanical strength, contributes to undesirable filter sheet characteristics in terms of reduced electrostatic capture efficiencies and capacities, and broadened pore diameter distributions in these filtration media. Cellulosic fibers are hollow and tend to collapse during drying to flat, ribbon-like structures which may be as wide as about 60 to 100 micrometers. As a result, the flow of liquids is obstructed, limiting, in practice, the use of filter sheets containing such fibers in sufficient quantity to provide good mechanical characteristics to relatively very coarse filters, e.g., greater than about 10 micrometers absolute.

In at least one attempt to prepare glass microfiber based filter media, a two step treatment with two different resins was attempted. Even in that instance, a cellulose based fiber was included as part of the filter media and, again, the problems associated with the use of cellulosic fibers are present.

The present invention is directed, then, to the preparation and use of charge modified inorganic microfiber containing filter media, particularly filter sheets, which substantially reduce the undesirable characteristics outlined above. The process of this invention provides filter sheets with narrowly distributed pore sizes and with pore sizes as small as about one-half micrometer absolute, excellent mechanical strength, and enhanced particulate removal efficiencies by means of electrostatic particle capture. The present invention is also directed to the preparation and use of charge modified inorganic microfiber dispersions or suspensions having use as filter aids.

DISCLOSURE OF INVENTION

The subject invention is directed to filter media comprising charge modified, resin coated inorganic microfibers prepared by mixing the inorganic microfibers with an aqueous solution of a water soluble, non-colloidal cationic thermosetting binder resin to form a microfiber dispersion, following which a precipitating agent (either anionic or non-ionic) is added to precipitate the binder resin and coat the microfibers. The resulting coated microfibers have a positive zeta potential in alkaline media, i.e., at a pH greater than 7, and can be used in the dispersed or suspended form as a filter aid. Preferably the coated microfibers are formed into a filter sheet which is then dried and cured. The filter sheet products of this invention have narrowly distributed pore sizes, pore sizes as small as one-half micron and excellent mechanical strength as well as a positive zeta potential in alkaline media. Because of the positive zeta potential, they also have enhanced particulate removal efficiencies and find use in applications requiring high levels of fine particulate removal including bacteria and endotoxins.

A preferred product of this invention is a filter sheet comprised of glass microfibers coated with a polyamine-epichlorohydrin resin designated R 4308 (described in more detail hereinafter) by precipitation of the resin from aqueous solution with an anionic precipitating agent, Nalcolyte 7763 (described in more detail hereinafter).

BEST MODE FOR CARRYING OUT THE INVENTION

The filter sheets or membranes of this invention are prepared by mixing inorganic microfibers normally having a negative zeta potential with an aqueous solution of a water soluble, non-colloidal cationic thermosetting polymer or binder resin to form a microfiber dispersion, adding a precipitating agent to the dispersion to precipitate the polymer or binder resin and coat the microfibers with the polymer or binder resin, and forming the coated microfibers into a filter sheet which exhibits a positive zeta potential in alkaline media. Filter sheets prepared by the preferred process of this invention and with the preferred binder resins or polymers exhibit a positive zeta potential over the broad pH range of from about 3 to about 10.

As one embodiment of this invention, the product obtained after the addition of the precipitating agent, i.e., a dispersion or suspension of coated microfibers in an aqueous medium, can itself be used as a filter aid, such as a filter precoat. Preferably, however, the dispersion of microfibers is used to form a filter sheet.

The inorganic microfiber filter sheets of this invention achieve high levels of performance in the removal of suspended particulates, bacteria and endotoxins in aqueous filtration applications such as pharmaceutical products, water purification, liquid food products and the like through the use of cationic thermosetting binder resins to modify the microfibers which make up the filter sheet.

Surprisingly, this performance is achieved by the use of a water soluble, non-colloidal, cationic thermosetting resin which imparts excellent mechanical strength and stability to the filter sheet along with enhanced particulate removal efficiencies over a broad pH range in aqueous fluids. Moreover, it has been discovered that the quantity of the cationic, thermosetting binder resin deposited onto the microfibers from aqueous solutions can be efficiently controlled through the controlled addition of certain polymeric precipitating agents.

Filter sheets of excellent strength are achieved using small quantities of the resin binders of this invention; typically no more than about 5 weight percent resin (based on the weight of the microfiber) is needed to achieve mechanical strengths equal to that obtained using substantially larger quantities of other resins, particularly anionic resins. Even at low resin binder concentrations, the desirable characteristics are retained. This is believed due to the substantial uniformity and continuity of the resin coating on the microfiber. Thus, the filter sheets of this invention do not require the use of mechanical reinforcing matrices such as cellulose fibers which tend to seriously degrade filter performance characteristics, including (1) greatly increasing clean pressure drop, and (2) closing off areas of the filter which would otherwise be available for fluid flow, reducing the capacity of the filter to collect large quantities of solid contaminants, and shortening service life. The filter sheets of this invention also exhibit narrowly distributed pore sizes and pore sizes as small as about one-half micrometer. Actual pore sizes in the range of from about 0.5 to about 50 micrometers, preferably less than 20, are obtainable. Effective particulate removal size ratings substantially below the actual pore size rating are obtainable.

As previously stated, the microfiber based filter sheets or membranes of this invention are prepared by treating inorganic microfibers, normally having negative zeta potentials, with water soluble, non-colloidal cationic thermosetting polymers or binder resins. Many such polymers or binder resin materials are readily available from commercial manufacturers in various forms and have found extensive use in paper manufacture as wet strength additives. The general characteristics and uses of these materials are described in, e.g., *Amino Resins,* J. J. Blair, Rheinhold Publishing Company, New York, 1959; *Wet Strength In Paper And Paper Board,* Tappi Monograph Series No. 29, 1965; *Polymeric Amines And Ammonium Salts,* E. J. Goethals, Pergamon Press, New York, 1980. The epoxide-based water soluble resins are preferred. Suitable epoxidebased water soluble cationic thermosetting polymers commercially available include both polyamido/polyaminoepichlorohydrin resins and polyamine-epichlorohydrin resins.

The binder resins used in this invention must meet several requirements. They must have the ability, while in the uncured state, to form true solutions in water. In this regard, the class of polymers or binder resins useful in this invention are, as described above, water soluble and non-colloidal. By this is meant that in treating inorganic microfibers to make the filters sheets of this invention, the microfibers are treated with a solution of the polymer or binder resin in a non-colloidal state. It does not mean that the polymer or binder resin is incapable of forming a colloid under appropriate conditions, only that this is an undesirable form of the polymer or binder resin for purposes of this invention.

A second requirement is that the polymer or binder resin must be capable of being cured into the crosslinked state by a simple conversion process involving no more than time, temperature and, optionally, a catalyst.

Another required characteristic of the binder resins useful in this invention is the presence of a high proportion of cationic charges, necessary since these charges produce filter membranes with the most desirable properties. Further, the cationic charge preferably should not simply rely on protonation. Rather, the charge should stem from quaternized ammonium groups whose cationicity is independent of pH.

Still another requirement of the binder resins of this invention is relative insensitivity to water swelling. Water swelling polymers lose mechanical strength as they swell. Crosslinking of a polymer reduces susceptibility to swelling and the mechanical integrity of formed structures containing the polymer are correspondingly enhanced.

Particularly preferred water soluble, non-colloidal cationic thermosetting polymers or binder resins are those containing a substantial number of quaternary ammonium groups, derived from any suitable aliphatic amine which has been fully quaternized. Such binder resins produce membranes or filter sheets with a high cationic charge and, surprisingly, display enhanced particle removal from aqueous fluids over a broad pH range of from about 3 to about 10 due to their positive zeta potential over that range, a desirable characteristic of filter sheets prepared by the preferred process and using the preferred binder resins of this invention.

Representative water soluble, non-colloidal cationic thermosetting polymers or binder resins which may be used to prepare the membranes of this invention include those described in U.S. Pat. Nos. 2,926,154, 3,332,901, 3,224,986 and 3,855,158, the disclosures of which are incorporated herein by reference. Commercially available water soluble, non-colloidal cationic thermosetting binder resins of the polyamido/polyaminoepichlorohydrin class, which are preferred for purposes of this invention, are Kymene ® 557 and the Polycup ® series of resins manufactured by Hercules Incorporated.

Especially preferred water soluble, non-colloidal cationic thermosetting resins are the polyamine-epichlorohydrin resins which contain quanternary ammonium groups. Resins of this type are made by reacting polyamines with epichlorohydrin and differe from the polyamido/polyamino-epichlorohydrin resins in several respects. They do not contain amide linkages in their composition and, contrary to commercial polyamido/polyamino-epichlorohydrins, derive a substantial degree of their cationicity from the presence of quaternary ammonium groups. Commercial compositions of this type are prepared by reacting epichlorohydrin with condensation products of polyakylene polyamines and ethylen dichloride. Compositions of this type are disclosed in U.S. Pat. No. 3,855,158 and are exemplified by Santo-res ® 31, a product of Monsanto Inc.

Another form of this preferred type of binder resin is prepared from the reaction of epichlorohydrin with polydiallyl methyl amine to produce an epoxide functional quaternary ammonium resin. Compositions of this kind are disclosed in U.S. Pat. No. 3,700,623 and are exemplified by Resin R 4308, a product of Hercules Inc. The disclosure of U.S. Pat. Nos. 3,855,158 and 3,700,623 are incorporated by reference herein.

Both these preferred classes of resins are epoxy functional, cationic thermosetting classes which derive substantial cationicity from quaternary ammonium groups and provide positive zeta potential in alkaline pH.

Many of the polymers or binders resin useful in the subject invention require activation. For the purpose of providing extended shelf lift or storage stability to these resins, the epoxide groups are chemically inactivated to prevent premature crosslinking of these resins. Thus, prior to the use of these resins for purposes of the present invention, the resins are activated into the reactive, thermosetting state by regeneration of the epoxide groups. Typically activation entails adding sufficient aqueous caustic to a solution of the inactive resin to chemically convert the inactive chlorohydrin form to the crosslinking epoxide forms. The parts by weight of aqueous caustic per parts by weight of resin vary with the product and are specified by the manufacturer. The activation process is efficient and complete activation is generally achieved in about thirty minutes, whereupon the resin solution is suitable for use.

The inorganic microfiber filter sheets or membranes of this invention can be prepared from any suitable inorganic microfibrous filter material known to those skilled in the art. Preferred materials are glass and titanate microfibers which have mean fiber diameters of from about 0.1 micrometer up to about 10 micrometers, although fibers lying outside this range can also be used. The median length of the glass microfibers to diameter ratio will generally be in the range of from 500 to 1000. Glass microfibers of this type are available from commercial manufacturers such PPG Industries, Johns-Mansville Inc., and Owens-Corning Fiberglass Corp., as well as other manufacturers. Sources for titanate fibers include Otsuka Chemical Company, Ltd (Japan) and E. I. Dupont de Nemours and Company.

The surprising discovery has been made that microfiber filter sheets or membranes with excellent properties can be prepared through the controlled deposition of cationic, water soluble, non-colloidal thermosetting binder resins onto microfibrous filter materials by the action of certain precipitating agents. The further surprising discovery has been made that, with the use of a precipitating agent, the amount of cationic binder resin deposited onto the microfiber surfaces can be varied over a wide range in a controlled manner, leading to microfiber filter sheets which are self-supporting and possess excellent mechanical strength. Unexpectedly, the microfiber filter sheets of this invention exhibit high cationic charge over a broad range of binder resin content and function with enhanced removal efficiencies through electrostatic effects.

The process of preparing the articles or compositions of this invention include in all cases the following sequential steps:

(1) mixing the inorganic microfibers with an aqueous solution of the binder resin or polymer to form a microfiber dispersion using conventional mixing steps well known in the art;

(2) adding a precipitating agent (either as a solution or in a dispersed state) to the dispersion of step (1) to precipitate the binder resin or polymer and coat the microfibers with the binder resin or polymer.

After precipitation and coating of the microfibers, the resulting dispersion can be used in substantially that form as a filter aid. Alternatively, and more desirably, the dispersion of coated microfibers is formed into a filter sheet. This can be carried out using conventional techniques, typically including forming a layer or mat of the dispersion on a foraminous surface, removing water from the layer or mat by drawing a vacuum through the foraminous surface, further drying the layer or mat and curing the binder resin or polymer to form the finished filter sheet.

While step (1) can be carried out by mixing dry microfibers and an aqueous solution of the binder resin or polymer to form a dispersion, it is preferred that the aqueous solution of binder resin or polymer be added to a first dispersion of the microfibers in water to form a second dispersion containing both the microfibers and the binder resin in water. It is also desirable that the pH of the resulting mixture be adjusted to an alkaline value, i. e., greater than 7, preferably from about 8 to about 10. Alternatively, the pH of the microfiber dispersion can be adjusted prior to mixing with the binder resin solution.

A variety of precipitating agents, both anionic and nonionic, are suitable in the practice of this invention. As a first requirement or limitation on the selection of appropriate precipitating agents, the material must be water soluble or water dispersible and have the ability to precipitate the cationic binder resin from aqueous solution. Synthetic water soluble or dispersible precipitating agents which are derived from natural or synthetic polymers are preferred. These types of agents are available from many commercial manufacturers and their properties and compositions are described in, for example, *Index of Commercial Flocculants*, H. A. Hamza and J. L. Picard, 1974 Canmet Report 77-78, Canada Centre for Mineral and Energy Technology, Canada, 1975; and *Ind. Min. J.* (Special Issue) R. D. Booth, J. E. Carpenter and H. Hartiens, 335, 1957. Precipitation of the cationic binder resin onto the suspended microfibers by the addition of high-molecular weight polymers containing anionic charges has been found especially effective.

A second requirement is that the combination in an aqueous medium of the microfibers, the binder resin and the precipitant must provide a stable system. That is, the combination should not produce a heavily flocculated product on the addition of the precipitant to the microfiber/binder resin aqueous system. Additionally, it is preferred that if the combination stands for a period of time, flocculation is limited and, to the extent that some flocculation of the microfibers does occur on standing, the system must be readily redispersible with agitation.

It is believed that the addition of a water soluble or dispersible anionic precipitant to a solution of a cationic binder resin, under the conditions described herein, causes the formation of a precipitated form of the cationic binder resin which adheres efficiently to the suspended microfibers. The interaction of the binder resin or polymer with the precipitating agent may result in precipitation of the precipitating agent together with binder resin. It should, therefore, be understood that the coating composition on the fibers may contain a proportion of precipitating agent.

It is also believed that the remarkable ability to control the quantity of cationic binder resin deposited on the dispersed microfiber by the method of precipitation may result, in part, from favorable zeta potential interactions between the cationic binder resin precipitate and the microfiber surface. Such interactions are known to be complex and various other mechanisms, such as electrostatic bonding, hydrogen bonding or other physicochemical interactions, may be responsible in whole or in part for the extremely desirable results obtained. Whatever the detailed interactions may be, it has been found that the addition of polymeric anionic and nonionic precipitating agents to water soluble, non-colloidal cationic binder resins in the presence of dispersed microfibers leads to the efficient coating of these fibers by the cationic binder resin. The very small quantities of resin required to achieve strong membranes are also believed to be a reflection of the efficiency and uniformity with which the fibers are coated by the method described.

Since the anionic precipitating agents used in this invention contain carboxyl or other ionizable acidic groups, their precipitating efficiency is a function of pH. Accordingly, the preparation of the resin coated microfibers used to prepare the filter sheets or membranes of this invention is most effectively carried out at pH conditions where the anionic groups are substantially completely ionized and provide the highest precipitation efficiency. In the present method it has been determined that carrying out the precipitation step under alkaline conditions produces the most satisfactory results. An alkaline pH, preferably in the range of from about 8 to about 10, provides optimum efficiency with the anionic precipitating agents, the precipitating agents of choice in the subject invention.

The preferred precipitating agents may be selected from a group of synthetic, water soluble or dispersible polymers containing anionic groups such as carboxylate or sulfonate. The carboxylate-containing polymers, such as acrylic acid copolymers, are especially preferred due to their efficiency, wide availability and low cost. Suitable precipitating agents for the purposes of this invention include anionics such as the Hercoflocs ® manufactured by Hercules Inc., the Puriflocs ® manufactured by Dow Chemical Corp., and the Nalcolyte ® series of anionic flocculants manufactured by Nalco Chemical Company. Suitable commercial precipitating agents include Nalcolyte ® 7763, 7766 and 7173, Product 18,127-7, (Aldrich Chemical Company) and Carboset 531, (B. F. Goodrich Company). Nalcolyte 7766 and 7173 are high molecular weight (greater than one million) copolymers of acrylamide and sodium acrylate. Nalcolyte 7763 is a copolymer resulting from reacting about 35% acrylic acid and about 65% acrylamide having a molecular weight of from about 5 to 10 million. The general structures of these materials are set out in U.S. Pat. Nos. 3,549,527, 3,617,542, and 3,673,083. They are ionic flocculating agents with the extent of ionicity determined by the relative proportion of sodium acrylate in the polymer. They are prepared by the controlled hydrolysis of polyacrylamide to polyacrylamide-co-acrylate and also by the direct copolymerization of acrylamide with sodium acrylate. Product 18-127-7 is a polyacrylamide with a molecular weight of 5 to 6 million. Carboset 531 is a water soluble, self-catalyzed thermosetting acrylic resin with a molecular weight of about one million. It is believed to contain N-methylol acrylamide groups and acrylic acid groups through which crosslinking occurs.

The preferred procedure for the preparation of the filter membranes of this invention is as follows: microfibers are dispersed in water by means well known to those skilled in the art, e.g., with a high efficiency mixer, such as Cowles mixer. The pH of the slurry is adjusted to the preferred range of 8 to 10 by the addition of a base, such as caustic or an acid, such as citric, as required. While sufficient agitation to provide a homogeneous microfiber dispersion is maintained, the desired amount of cationic thermosetting polymer or binder resin in aqueous solution is added. An aqueous solution or dispersion of the anionic precipitating agent is then added while vigorous agitation of the microfiber dispersion is maintained.

After completion of these steps the dispersion of resin coated microfibers may be converted to a microfiber filter sheet or membrane by processes known to those skilled in the art, e.g., using a Fourdrinier forming wire and the like. A good filter sheet can be made by placing a porous sheet such as an unwoven polyester mat on a steel wire screen support atop a steel cylinder section and placing the dispersion of coated microfibers on the mat (with an open ended steel cylinder section sitting on top of the mat to provide containment for the dispersion), to form a very wet layer or mat of the coated microfibers. A vacuum is then drawn through the mat by means of a vacuum pump attached to the lower steel cylinder section to remove water from the coated microfiber dispersion. This technique was used in forming filter sheets of this invention described in the Examples. After formation, the filter medium is dried, following which it may be subjected to a curing step, preferably at an elevated temperature, to crosslink the cationic binder resin and produce the strong, self-supporting filter sheet or membrane of this invention. The drying and curing can be viewed as occurring simultaneously since, during drying, some curing may also occur.

The glass or other microfibers are conveniently dispersed in water to form a homogeneous slurry at a concentration ranging from about 2 grams per liter to as high as 50 grams per liter, preferably from about 2 to about 10 grams per liter. The actual microfiber concentration can vary over a wide range as long as a homogeneous dispersion results with mechanical agitation. Too low a concentration will, of course, make the process unnecessarily costly and too high a concentration will render attempts to disperse the microfibers difficult.

The cationic binder resin is preferably added to the microfiber dispersion as an aqueous solution in an amount such that the total weight of cationic binder resin solids added, based on the weight of the microfibers, ranges from about 1 weight percent to as high as about 40 weight percent, preferably from about 5 to about 30 weight percent. The binder resin is preferably added to the microfiber as an aqueous solution of from about 1 weight percent to about 10 weight percent, preferably about 5 weight percent.

The quantity of precipitating agent required to precipitate the cationic binder resin or polymer onto the microfiber surfaces may vary from as little as 1 weight percent to as high as 100 weight percent (dry weight of precipitant based on the dry weight of the cationic binder resin present in the microfiber dispersion). The proportion added will vary with the specific nature of the cationic thermosetting binder resin and the anionic precipitating agent combination. However, in order to produce all the desirable properties of the filter sheets or membranes of this invention, the relative weight proportion of the anionic precipitating agent should preferably be maintained at addition levels no greater than that of the cationic thermosetting binder resin.

For the preparation of microfibrous filter sheets or membranes with the preferred cationic binder resin R-4308 and the preferred precipitating agent Nalcolyte 7763, the preferred weight ratio of binder resin to precipitating agent is in the range of about 50:1 to about 1:1. The particularly preferred range for this combination of binder resin and precipitating agent is from about 10:1 to about 1:1.

It has been found that the best results are achieved by the addition of the precipitating agent as a dilute aqueous solution or dispersion. Aqueous solutions or dispersions of the precipitating agent in excess of about 4 weight percent have been found undesirable since feed rate requirements are excessively low and membranes with reduced homogeneity tend to result. Feed concentrations of the precipitating agent in aqueous solution or dispersion are preferably in the range of from about 0.01 weight percent to about 1 weight percent; a concentration of about 0.16 weight percent being particularly preferred.

The process of precipitation is recognized as a complex and poorly understood process and optimum conditions are best established through trial and error. Thus, the rates of precipitating agent addition and the mixing conditions for the microfiber dispersion for the membranes of this invention are optimized on an individual basis through trial and error. It has, however, been found to be a general requirement that the addition rates of the precipitating agent solution be sufficiently slow and agitation of the microfiber dispersion vigorous enough to prevent loss in dispersion characteristics or aggregation of the microfibers since these effects reduce filter sheet strength and adversely effect particulate removal efficiency. By observing the quality of the microfiber dispersion and setting the maximum feed rate of the precipitant to avoid degradation of fiber dispersion quality, i.e., flocculation, the optimum feed rate (from the standpoint of minimizing throughput time) can be determined.

The cationic binder resin coated microfibers dispersed in aqueous solution can be used in the form of a suspension or dispersion as a filter aid, either as a precoat or as a precoat and body feed mixed with the liquid to be filtered. Preferably, they are converted to filter sheets by well known methods. An example is the technique described above and used in preparing the exemplary filter sheets. An alternative is the use of a Fourdrinier apparatus. In the finished products, the coating content will typically be in the range of about 1 to about 40 weight percent (based on the weight of the microfibers), preferably in the range of about 5 to about 30 weight percent.

After drying, the formed microfiber filter sheets are cured to convert the binder resin into a crosslinked, mechanically strong and insoluble polymer providing strong bonding between the microfibers. Curing may be carried out at ambient temperatures for an extended period. However, curing can be effectively carried out at elevated temperatures between 50 and 200 degrees C. for from as much as several days to as little as several minutes. Cure times of less than an hour in combination with a curing temperature of about 75 degrees to 125 degrees C. are generally preferred.

The filter sheets of this invention will typically have dry tensile strengths of from about 0.4 (7 kg/m) to about 3 pounds per inch (50 kg/m). They can, of course, be used in the form of flat planar sheets. They can also be mechanically worked into accordion form and incorporated into filter element structures of the type well known in the industry.

The filter sheets of this invention can also be attached to a porous substrate or backing for additional strength desirable in some uses. In this approach, the dispersion of resin coated microfibers and precipitating agent can be formed into a filter sheet by direct deposition onto a substrate web which has been pretreated with a precipitated adhesive resin which provides intimate adhesion of the in situ formed filter sheet to the substrate web after drying and curing.

Suitable filter sheet supports or substrates are open fibrous webs such as cellulose fiber (paper), woven glass fiber cloth, and woven or nonwoven materials made from polymer filaments. Preferred webs are spun bonded or woven webs of filaments of polyester, polypropylene, polyamides and other thermoplastic synthetic resin fibers. Especially preferred for this invention are nonwoven, spun bonded polyester webs with sheet weights of from about 3 grams per meter squared to about 300 grams per meter squared, sold commercially by DuPont under the trademark Reemay ®.

In order to prepare the substrate web, it is fist treated with an aqueous solution of an adhesive resin compatible with the binder resin retaining the microfibers and then with an aqueous solution or dispersion of a precipitating agent. The precipitating agent causes the precipitation of the adhesive resin and the coating of the fibers of the substrate web which, in turn, provides excellent adhesion of the subsequently deposited inorganic microfiber filter sheet.

The adhesive resin and precipitating agent used to treat the substrate web are preferably the same as those used in coating microfibers. However, the only criteria for selection of the binder resin is that it be compatible with the binder resin on the microfibers and provide good adhesion between the filter sheet and the substrate web.

The treatment of the web is preferably carried out by first applying to the web an aqueous solution of an adhesive resin at a concentration of from about 1 to about 10 weight percent, preferably at about 2 to 5 weight percent. The binder resin is then precipitated onto the fibers of the web by applying to the web an aqueous solution or dispersion of the precipitating agent, preferably Nalcolyte 7763 or Carboset 531, at a weight concentration of from about 0.01 to about 5 weight percent and introducing the agent into the fibrous matrix of the substrate web to mix with the adhesive resin. The preferred concentration of the precipitating agent is from about 0.1 to about 3 weight percent. Typically the total volume of treating solutions (resin and precipitating agent) will be in the range of 10 to 50 milliliters per square foot of substrate web.

The application of the resin solution to the substrate web can be carried out by immersion coating, transfer coating and other methods known to the art. In the present method, a transfer coating thickness of from about 0.005 inch (0.013 cm) to 0.010 inch (0.025 cm) is preferred for both the adhesive resin solution and the precipitating agent solution. The adhesive resin treated substrate web is then mounted on any suitable apparatus which permits deposition on the surface of the substrate web of an aqueous slurry containing treated inorganic microfibers and from which the water in the slurry can be drawn through the substrate web, thereby forming the microfiber filter sheet in intimate contact with the substrate web. The formed microfiber filter sheet on the treated substrate web is then dried and cured as previously described.

The thus prepared substrate supported filter sheets are in the form of an intimately substratebonded filter which possesses excellent mechanical strength and rigidity. Such filter sheets are especially useful in filtration where high differential pressures may be encountered and fracture resistant membranes are required. Such sheets may, furthermore, be conveniently converted into filter elements by conventional methods known to the art. An alternative, albeit less desirable, technique is the formation of the filter sheet as a separate entity, following which it is secured to a support substrate web using a compatible adhesive resin.

The mechanical strengths, the low concentrations of resin required, the fine pore ratings and very narrow pore size distributions, and the enhanced particle removal efficiencies of the membranes of this invention are substantial improvements over prior art filtration membranes. These characteristics are illustrated by the following examples.

Method of Testing the Filter Sheets or Membranes of the Following Examples

The properties of the microfiber filter membranes of the following examples were evaluated by a variety of test methods, as described below:

(a) Tensile Strength

Tensile strength was measured on an Instron Universal Testing Instrument Model 1130, according to ASTM Method D882.

(b) Zeta Potential

The zeta potentials of microfiber filter sheets were calculated from measurements of the streaming potentials generated by flow of a 0.001 weight % solution of KCl in distilled water through several layers of the membrane secured in a filter sheet or membrane holder. Zeta potential is a measure of the net immobile electrostatic charge on a membrane surface exposed to a fluid. It is related to the streaming potential generated when that fluid flows through the membrane by the following formula (J. T. Davis et al, *Interfacial Phenomena*, Academic Press, New York, 1963):

$$\text{Zeta potential (mV)} = \frac{4\pi\eta}{D} \cdot \frac{E_s \lambda}{P}$$

wherein $\eta$ is the viscosity of the flowing solution, D is the dielectric constant of the solution, $\lambda$ is its conductivity, $E_s$ is the streaming potential, and P is the pressure drop across the membrane during the period of flow. In the following examples, the quantity $4\pi\eta/D$ is constant, having the value $2.052 \times 10^{-2}$, making the zeta potential equal to:

$$\text{Zeta potential (mV)} = \frac{2.052 \times 10^{-2} \cdot E_s \text{(Volt)} \cdot \lambda(\text{umho/cm})}{P \text{(psi)}}$$

(c) Aqueous Particulate Removal Efficiencies

A procedure for determining filter removal ratings in aqueous service is the OSU F-2 filter performance test which has gained wide acceptance in various industries. The apparatus used is an automatic particle counter, Model PC-320, available from Hiac-Royco Instruments of Menlo Park, California. The device has a CMB-60 detector upstream, a CM-60 detector downstream and allows the rapid challenge of test membranes with an aqueous suspension of silicious test dust in the particle diameter range of from 0.1 to 40 micrometers. The apparatus has two sets of six channel particle counters which can be set to any preselected range of particle diameters and automatically record particle concentrations in the incident flow and effluent flow from the filter. The apparatus also automatically records the ratio known as beta ($\beta$), which is the ratio of the number of incident particles to the number of effluent particles at each of the six particle diameters selected. Beta is related to particle removal efficiency, expressed as % removal, as follows:

$$\% \text{ removal} = \frac{\beta - 1}{\beta} \times 100.$$

(d) Bacterial Titer Reduction

The microfiber test filter sheet or membrane was assembled in a sterile membrane holder having a diameter of 14.2 centimeters and an effective filtration area of 0.1 square feet(92.9 cm$^2$). The assembled apparatus was sanitized by filling with alcohol and allowed to stand for about fifteen minutes, followed by flushing with about 2 liters of sterile, deionized water to remove the alcohol. A suspension of *Pseudomonas diminuta* (Ps.d) (ATCC 19146) or *Serratia marcescens* (SM) (ATCC 14756) was prepared in a pressure vessel in sterile deionized water at concentrations of $10^3$ to $10^7$ bacterium per milliliter. The aqueous bacterial suspensions were passed through the filter membrane at a flow rate of approximately 100 milliliters per minute and effluents collected at 10-fold increasing challenge levels, The effluent fractions were analyzed for bacterial concentration by passing appropriate dilutions through sterile 0 2 micrometer analysis membranes and culturing on Mueller-Hinton Agar (BBL) for 48 hours (Ps.d) and 24 hours (SM) at 32 degrees.C The titer reduction defined as the ratio of influent bacterial count to effluent bacterial count, was then calculated.

(e) Endotoxin Titer Reduction

The microfiber test filter sheet or membrane was prewetted with isopropyl alcohol and placed in a depyrogenated disc holder 47 millimeters in diameter and having an effective filtration area of 0.01 square feet (9.29 cm$^2$). Approximately 50 milliliters of pyrogen-free water was passed through the assembly and the last 3 or 4 milliliters collected as a negative control for the system. Purified *E. coli* endotoxin (055.B5) at a concentration of about 1 nanogram per milliliter was passed through the test membrane at a flow rate of about 5 milliliters per minute to a total volume of 10 milliliters. Serial 10 milliliter challenges were repeated with 10-fold increasing concentrations of endotoxin to a maximum challenge concentration of 100 nanograms per milliliter The last 3 to 4 milliliters of effluent from each incremental challenge were collected and analyzed for endotoxin concentration. The influent and effluent samples were analyzed for endotoxin concentration by the Limulus Amoebocyte Lysate (LAL) test according to the procedure of the U. S. P Bacterial Endotoxins Test.

(f) Filter Membrane Coating Content

Since the microfiber filter membranes in the Examples herein are composed of only the microfiber filter medium and the coating material, the coating material content of the membrane was established by a simple procedure. Suitably-sized samples of the membranes were carefully weighed and then subjected to a high temperature oxidizing flame, such as a Bunsen burner, for sufficient time to remove all the coating material by its conversion to gaseous components. The remaining microfiber components of the membrane, although extremely fragile, were weighed with care and the reduction in weight, due to the loss of coating material, determined. This method was used to establish the coating material content in all the membranes of the Examples herein.

(g) Latex Particle Removal

Monodisperse suspensions of polystyrene latex with well-characterized particle sizes (available from Dow Diagnostics Inc.) were prepared in approximate 0.1% by weight solutions in deionized water containing 0.1% Triton X-00 (an adduct of nonyl phenol with about 10 moles of ethylene oxide). Latex suspensions were forced through the test membranes in an appropriate membrane holder and the effluent passed through an optical flow cell in a light scattering photometer (Model 2000D, available from Phoenix Precision Instrument Inc.). The scattering signal from a beam of 5 37 nm light, measured at 90 degrees, was converted to latex bead concentration by means of an empirically determined concentration-scattering intensity correlation for each latex size. Latex bead capacities were derived from measured efficiencies and total volume of latex bead challenge.

General Method of Preparation of the Filter Sheets or Membranes of the Following Examples Commercially available microfibers, such as glass or fibrous titanate were dispersed in water in amounts ranging from about 1 gram per liter to about 10 grams per liter with the aid of a high shear mixer, such as a Waring Blender. Agitation was continued until a well dispersed homogeneous fiber dispersion was achieved, generally requiring 15 to 30 minutes. While agitation was maintained, from 3 to 30 percent by weight of activated Resin R-4308 (or other binder resin, as described in the Examples) based on the weight of the microfiber and as a 5 weight percent aqueous solution, was added to the dispersion. After the addition of the cationic binder resin solution, the pH of the solution was adjusted to a pH in the range of 8 to 10. with an aqueous caustic solution. In some instances the pH was adjusted prior to addition of the binder resin. While mechanical agitation was maintained, the mixture was then treated with a 0.16 weight percent aqueous dispersion of Nalcolyte 7763 at a sufficiently slow rate to prevent observable agglomeration of the microfibers. A sufficient volume of the Nalcolyte 7763 (or other precipitant) was added to bring the weight ratio of cationic binder resin to anionic precipitating agent to within the preferred range of from 10:1 to 1:1.

The optimum ratio of binder resin to precipitating agent varies somewhat depending on the specific properties of the microfiber, its chemical composition and the mean fiber diameter; however, it generally falls in the range of 10:1 to 1:1. For the preparation of most glass microfiber filter sheets, a ratio of cationic binder resin to precipitating agent of about 4:1 to 1:1 is preferred.

The homogeneous dispersion of cationic binder resin-coated microfibers was then converted into a filter sheet by vacuum formation using a porous drainage support and conventional techniques as described above. Any desired sheet weight of from less than 1 gram per square foot (10 grams/m2) to about 10 grams per square foot (100 grams/m2) was prepared. .The filter sheet was then dried and cured for about 15-30 minutes at a temperature of from about 100 to 150 degrees C. The filter sheets were then ready for use in filtration applications or for testing as indicated below.

EXAMPLES 1-4

Four filter membranes were prepared, in each Example using the procedure set out in steps (A) through (F) below:

(A) Six grams of glass microfibers with a mean fiber diameter of 0.35 micrometers were dispersed in 1 liter of water. The dispersion was mixed for fifteen minutes in a Waring Blender.

(B) While mixing was continued, the amount of activated binder resin R-4308 listed in Table I below for each Example was added to the dispersion (as a 5% by weight solution in water and based on the weight of the microfibers).

(C) The mixture was then agitated for an additional five minutes, at which point the pH was adjusted to 10 with caustic.

(D) While mixing continued, the appropriate volume (see Table I below) of Nalcolyte 7763 as a 0.16 weight percent solution in water was added at the rate of 30 milliliters per minute.

(E) Mixing was then continued for an additional fifteen minutes.

(F) Filter sheets were then vacuum cast at 2.7 grams per square foot (929 cm2) and cured for ten minutes at 150 degrees C.

TABLE I

| Example | % Binder Resin Added | % Nalcolyte 7763 Added |
|---|---|---|
| 1 | 1 | 0.5 |
| 2 | 2 | 1.0 |
| 3 | 3.5 | 1.75 |
| 4 | 5.0 | 2.5 |

The properties of the filter sheets formed are set out in Table II below:

TABLE II

| Filter Sheet of Example | Percent Coating Content | Tensile Strength Pounds per Inch | Zeta Potential in Millivolts at pH |
|---|---|---|---|
| 1 | 1.8 | 0.26 | +19 at 7.1 |
| 2 | 3.0 | 0.39 | +22 at 7.05 |
| 3 | 4.4 | 0.60 | +19 at 7.1 |
| 4 | 7.0 | 0.97 | +20 at 7.2 |

These Examples illustrate the utility of the subject invention at low levels of added binder resin, reflecting the efficiency of the resin in thoroughly coating the glass fiber surfaces. At 1.8 percent coating content, the average thickness of the coating is calculated to be only 10 to 15 Angstroms, of the order of magnitude of the dimensions of the resin molecules.

EXAMPLE 5

Glass microfibers with a mean fiber diameter of 0.58 micrometers were dispersed in water at a concentration of 4 grams per liter as outlined above. The pH of the fiber dispersion was adjusted to about 9 with 0.1N sodium hydroxide and, while stirring was maintained, 5 weight percent of activated Resin R4308, (based on the weight of the microfibers) was added as a 5 weight percent aqueous solution. While agitation was maintained, the microfiber dispersion containing Resin R4308 was treated with an amount of a 0.16 weight percent aqueous solution of Nalcolyte 7763 sufficient to produce a Resin R4308 to Nalcolyte 7763 weight ratio of 2:1 The cationic binder resin coated glass microfiber dispersion was formed into a filter sheet at 3.2 grams per square foot and cured for five minutes at 130 degrees C.

EXAMPLE 6

The process of preparing the filter sheet outlined in Example 5 was repeated except that 20 weight percent of activated Resin R4308 (based on the weight of the glass microfiber) was added to the fiber dispersion The volume of added 0.16 weight percent Nalcolyte 7763 solution was increased by a factor of 4 to maintain a weight ratio of Resin R4308 to Nalcolyte 7763 of 2:1. The resin coated glass microfiber dispersion was formed into a filter sheet at 2.2 grams per square foot and cured for five minutes at 130 degrees C..

EXAMPLE 7

The procedure of Example 6 was repeated except that 30 weight percent activated Resin R4308 was added and the volume of 0 16 weight percent Nalcolyte 7763 solution was increased to maintain a Resin R4308 to Nalcolyte 7763 weight ratio of 2:1. The resin coated fiber dispersion was then formed into a filter sheet at 2.1 grams per square foot and cured for five minutes at 130 degrees C.

EXAMPLE 8

The procedure described in Example 7 was repeated except that glass microfibers with a mean fiber diameter of 3.2 micrometers were dispersed in water and 25 percent by weight activated Resin R4308 was added at a dispersion pH of about 10. A sufficient volume of 0.16 percent Nalcolyte 7763 was added to produce a Resin R4308 to Nalcolyte 7763 ratio of 2:1. A filter sheet was then formed at 2 grams per square foot sheet weight and cured for thirty minutes at 125 degrees C.

Properties of the membranes of Examples 5 through 8 are listed in Table III below.

TABLE III

| Filter Sheet of Example # | Percent Coating Content | Tensile Strength Pounds per Inch | Zeta Potential in millivolts at pH |
|---|---|---|---|
| 5 | 5.7 | 1.6 | +25 at 6.4 |
| 6 | 16.8 | 1.8 | +18 at 6.5 |
| 7 | 24.9 | 2.0 | +15 at 6.4 |
| 8 | 23.8 | 1.1 | +18 at 6.2 |

The membranes of Examples 5 through 8 and their listed properties demonstrate the novel and unexpected results from the method of the present invention. Prior art efforts to manipulate and control the level of binder resin incorporation while maintaining other desirable membrane properties have not generally been successful. Prior art methods typically cause the binder resin to precipitate as a separate, very fine suspension among the dispersed fibers and not on the fibers. Formation of membranes from such dispersions results in substantial loss of the binder resin during vacuum forming and produces membranes of low strength. Prior art methods are also prone to the formation of very large agglomerates of binder resin and tend to produce membranes of poor strength and poor appearance caused by inhomogeneous resin distribution. Unexpectedly, the method of the present invention provides membranes where the quantity of incorporated binder resin can be varied at will producing high mechanical strength, positive zeta potential and very uniform membrane appearance.

EXAMPLE 9

Glass microfibers with a mean fiber diameter of 0.3 micrometers were dispersed in water at 4 grams per liter, the pH adjusted to about 9 and then treated with a 5 weight percent solution of activated Resin R4308 in water as outlined in Example 5. The fiber dispersion was then treated with a sufficient volume of 0.16 weight percent Nalcolyte 7173 to produce a Resin R4308 to Nalcolyte 7173 weight radio of 2:1. The cationic binder resin coated fibers were formed into a filter sheet at 2 grams per square foot and cured five minutes at 130 degrees C.

EXAMPLE 10

The procedure of Example 9 was repeated except that Aldrich Chemical Company's product number 18,127-7 was substituted for the Nalcolyte 7173.

EXAMPLE 11

The method of filter sheet preparation outlined in Example 5 was repeated except that (a) glass microfibers with a mean fiber diameter of 0.9 micrometers were used and (b) 18 percent by weight (based on the weight of the microfiber) of activated Santo-res 31 was added to the dispersion rather than Resin R4308. Sufficient 0.16 percent solution of Nalcolyte 7763 was added to attain a Santo-res 31 to Nalcolyte 7763 weight ratio of 3.3:1. A filter sheet was prepared from this material at 2.0 grams per square foot and cured at 120 degrees C. for thirty minutes.

EXAMPLE 12

The method of filter sheet preparation of Example 11 was repeated except that the weight ratio of Santores 31 to Nalcolyte 7763 was adjusted to 2:1. A filter sheet was prepared from this material at 2.0 grams per square foot and cured at 120 degrees C. for thirty minutes.

EXAMPLE 13

The procedure of Example 9 was repeated except that Carboset 531 was substituted for the Nalcolyte 7173.

Properties of the filter sheets of Examples 9 through 13 are listed in Table IV:

TABLE IV

| Filter Sheet of Example # | Percent Coating Content | Tensile Strength Pounds per Inch | Zeta Potential in millivolts at pH |
|---|---|---|---|
| 9 | 5.8 | 1.8 | +34 at 6.4 |
| 10 | 6.2 | 0.6 | +32 at 6.4 |
| 11 | 9.7 | 0.7 | +22 at 6.0 |
| 12 | 18.4 | 0.8 | +34 at 6.0 |
| 13 | 3.9 | N.D. | +37 at 6.4 |

The preparation of filter sheets of this invention according to Examples 9 through 13 demonstrates the use of various precipitating agents and cationic, water-soluble thermosetting binder resins.

EXAMPLE 14

The general filter sheet preparation method of Example 5 was repeated except that a mixture of (a) 4 parts by weight glass microfibers, with a mean fiber diameter of 0.3 micrometers, and (b) 6 parts by weight titanate microfibers with a mean fiber diameter of about 0.1 micrometer was employed. The glass microfibers were separately dispersed in water at a concentration of 4 grams per liter, the pH of the dispersion adjusted to 9 and 15 weight percent activated Resin R4308 (based on the weight of the glass microfibers) as a 5 weight percent aqueous solution was added to the dispersion. Sufficient Nalcolyte 7763 (as an aqueous 0.16 percent solution) was added to produce a Resin R4308 to Nalcolyte 7763 ratio of 2:1. In like manner, the titanate microfibers were separately treated with 20 weight percent of activated Resin R4308, followed by addition of Nalcolyte 7763 in an amount such that the ratio of Resin R4308 to Nalcolyte 7763 was 10:1. The cationic binder resin coated microfiber suspensions were then mixed at the required relative volumes to provide a 4 parts by weight glass microfiber to 6 parts by weight titanate microfiber, formed into a filter sheet at 2 grams per square foot and cured. Latex particle challenge tests showed an absolute removal rating of 0.6 micrometers.

EXAMPLE 15

The general filter sheet preparation method of Example 5 was repeated except that the binder resin coated microfibers were formed into a filter sheet at 3.1 grams per square foot and cured for ten minutes at 130 degrees C.

The zeta potential of the filter sheets of Examples 14 and 15 as a function of filter sheet pH environment was determined and is set out in Table V.

TABLE V

| Filter Sheet of Example # | Zeta Potential in Millivolts at pH indicated | | | |
|---|---|---|---|---|
| 14 | +12 at 4.0 | +12 at 6.0 | +12 at 8.0 | +8 at 10.3 |
| 15 | +25 at 3.5 | +17 at 5.4 | +12 at 7.3 | +3 at 10.3 |

EXAMPLE 16 through 20

In the following Examples 16 through 20, microfiber filter sheets utilizing glass microfibers with various mean fiber diameters were prepared according to the general method of Example 5. The weight percent of added Resin R4308 was maintained at about 5 weight percent based on the weight of the microfiber. The weight ratio of Resin R4308 to Nalcolyte 7763 was maintained at about 2:1. The variation in filter sheet weights along with other properties of the membranes of these Examples are shown in Table VI.

TABLE VI

| Filter Sheet of Example | Mean Microfiber Diameters, Micrometers | Sheet Weight Grams per Square Foot | Percent Coating Content | Tensile Strength Pounds per Inch |
|---|---|---|---|---|
| 16 | 0.52 | 3.1 | 7.3 | 2.1 |
| 17 | 0.80 | 2.4 | 4.8 | 0.32 |
| 18 | 0.58 | 3.2 | 6.4 | 1.61 |
| 19 | 2.2 | 2.4 | 5.0 | 0.42 |
| 20 | 0.30 | 4.5 | 6.6 | 1.9 |

The filter sheets prepared by Examples 16 through 20 were evaluated for their removal efficiencies of silicious particulate suspensions in aqueous medium at about neutral pH by the previously described OSU F-2 filter performance test. For purposes of comparison, glass microfiber filter sheets produced using glass microfibers with identical mean fiber diameters (but not prepared by the method of this invention) are included in the test evaluation. Each comparative filter sheet is a commercially available filter sheet manufactured by Pall Corporation and sold under the Trademark Ultipor GF ®. In the listings in Table VII, these comparative membranes are designated by the term "Control". In each case, the physical configuration, weight of glass per unit area and the deposition of the fibers are identical, except that, due to the binder resin used, Ultipor GF ® filter sheets have a negative zeta potential in the range of −30 to −70 millivolts.

TABLE VII

Ratings in Micrometers at Percent Removal Indicated

| Filter Sheet of Example | Efficiency % | | | | |
|---|---|---|---|---|---|
| | 99.95 | 99.9 | 99 | 95 | 90 |
| 16 | <1.0* | <1.0 | <1.0 | <1.0 | <1.0 |
| Control | 2.5 | 2.0 | 1.0 | <1.0 | <1.0 |
| 17 | 6.0 | 4.5 | 2.4 | 1.5 | 1.0 |
| Control | 7.0 | 4.7 | 3.2 | 2.7 | 1.4 |
| 18 | 1.0 | 1.0 | 1.0 | <1.0 | <1.0 |
| Control | 4.0 | 3.3 | 2.1 | 1.7 | <1.0 |
| 19 | 10 | 8.5 | 6.0 | 5.0 | 3.0 |
| Control | 11 | 10 | 9.0 | 8.0 | 5.5 |
| 20 | <1.0 | <1.0 | <1.0 | <1.0 | <1.0 |
| Control | <1.0 | <1.0 | <1.0 | <1.0 | <1.0 |

*Lower limit of detector capability is 1.0.

The filter sheets of Examples 16 through 20 demonstrate the selection in pore diameters which are possible in the process of this invention. Thus membranes with pore removal ratings (as determined by the OSU F-2 test) of from less than 1 micrometer to greater than 10 micrometers and having high removal efficiencies are accessible by the present process. Prior art filter sheets containing large diameter cellulose reinforcing matrices cannot achieve such preselected pore ratings or such high removal efficiencies.

The filter sheets of Examples 16 through 20 demonstrate enhanced removal efficiency of aqueous suspensions of silicious test dust compared to prior art filter sheets as demonstrated by the efficiencies listed in Table VII.

Figure 1:
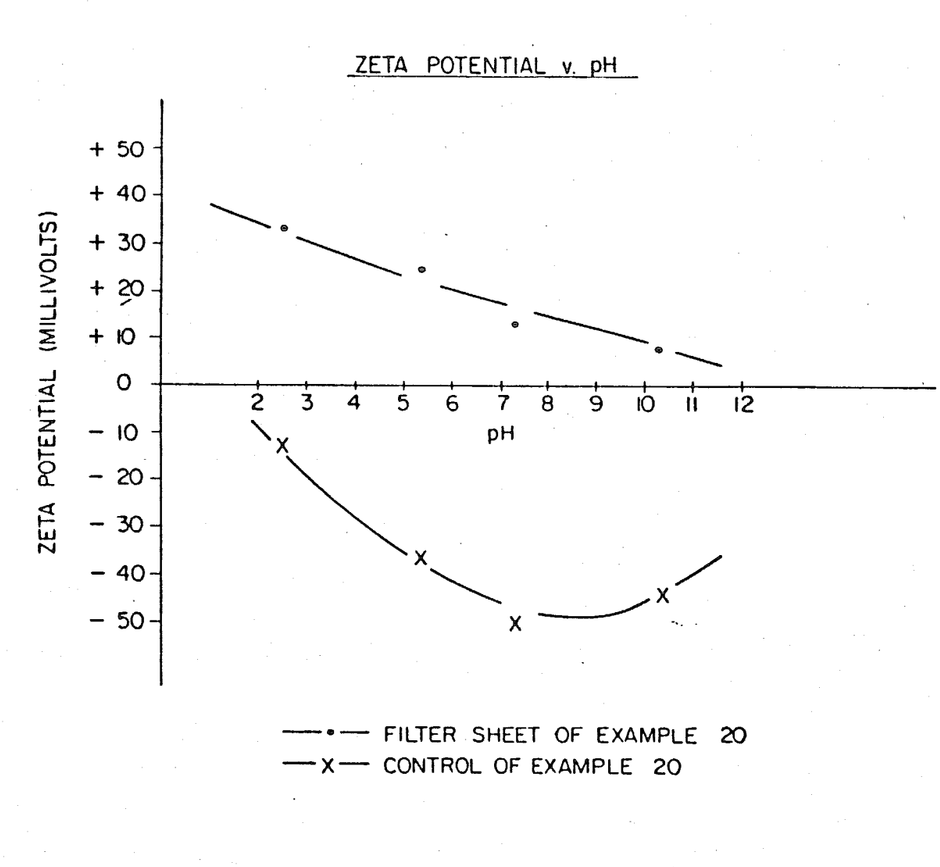
The drawing is a graph of zeta potential plotted versus pH for (a) a filter sheet prepared by the method of this invention at a pH of about 9 (Example 20) and (b) the prior art filter sheet termed Control in Example 20.

The zeta potential of the filter sheet of Example 20 and the corresponding Control were measured at various pHs. The results are shown in the drawing.

EXAMPLES 21 THROUGH 28

Microfiber filter sheets in accordance with this invention were prepared according to the general method of Example 5 with the exception of Example 21 which was prepared by the method of Example 14 using, as in Example 14, a mixture of glass microfibers and titanate microfibers. In the case of Examples 22 through 28, glass microfibers with differing mean fiber diameters, as shown in Table VIII, were utilized. Filter sheet weights and other properties of the filter sheets of these examples are also listed in Table VIII.

TABLE VIII

| Filter Sheet of Example | Mean Microfiber Diameter, Micrometers | Sheet Weight in Grams per Square Foot | Percent Coating Content | Tensile Strength Pounds per Inch |
|---|---|---|---|---|
| 21 | 0.12 | 2.0 | 17 | N.D. |
| 22 | 0.38 | 4.5 | 6.6 | 1.91 |
| 23 | 0.52 | 3.1 | 7.3 | 2.07 |
| 24 | 0.58 | 3.2 | 6.4 | 1.61 |
| 25 | 0.80 | 2.4 | 4.8 | 0.32 |
| 26 | 2.2 | 2.4 | 5.0 | 0.42 |
| 27 | 2.1 | 1.7 | 8.4 | 0.27 |
| 28 | 3.2 | 3.2 | 9.0 | 0.98 |

The filter sheets of Examples 21 through 28 were evaluated for their efficiency in the filtration of aqueous suspensions of monodisperse latex particles by the Latex Particle Removal test method previously described. For comparative purposes, filter sheets prepared with microfibers of identical mean fiber diameters, but not by the method of the present invention, are included in the test evaluation and designated "Control" in each Example. The comparative filter sheets are manufactured by Pall corporation and sold under the trademark Ultipor GF ®. The results of these tests are set out in Table IX.

TABLE IX

| Filter Sheet of Example | Test Latex Bead Diameter in Micrometers | Latex Capacity in Grams Per Square Foot of Membrane Area at Percent Removal Efficiency Indicated % | | | |
|---|---|---|---|---|---|
| | | 99.999 | 999.99 | 99.9 | 99.0 |
| 21 | 0.29 | 4.0 | 5.2 | 6.2 | 6.6 |
| Control | 0.29 | 1.3 | 1.7 | 2.0 | 2.8 |
| 22 | 0.40 | 2.0 | 2.2 | 2.5 | 3.8 |
| Control | 0.40 | 0 | 0.2 | 1.2 | 2.0 |
| 23 | 0.80 | 2.7 | 3.2 | 3.9 | 5.2 |
| Control | 0.80 | 0 | 0.2 | 0.4 | 1.4 |
| 24 | 1.1 | 3.0 | 3.8 | 4.6 | 7.0 |
| Control | 1.1 | 1.5 | 1.7 | 1.9 | 2.6 |
| 25 | 2.8 | 3.0 | 4.0 | 7.2 | >30 |
| Control | 2.8 | 0.8 | 1.0 | 1.4 | 2.0 |
| 26 | 3.4 | 2.4 | 2.6 | 3.2 | 7.6 |
| Control | 3.4 | 1.0 | 1.2 | 1.4 | 1.6 |
| 27 | 7.6 | 1.6 | 2.0 | 3.4 | 7.6 |
| Control | 7.6 | 0 | 0.2 | 2.0 | 3.4 |
| 28 | 12 | 9.0 | 30 | >30 | >30 |
| Control | 12 | 1 | 1.4 | 1.8 | 2.2 |

The latex bead capacities and efficiencies of the filter sheets prepared in Examples 21 through 28 are clearly superior compared with prior art filter sheets prepared with microfibers with substantially identical means fiber diameters. Also made evident by the results listed in Table IX is the substantial improvement in latex particle removal efficiency of cationic binder resin containing microfiber filter sheets prepared with microfiber of widely varying mean diameter. It is furthermore evident that filter sheets prepared with glass microfibers of relatively large mean fiber diameter display a large improvement in the filtration efficiency of large latex particles when compared with commercially available glass microfiber filters.

EXAMPLE 28a

Comparative filter life or dirt holding capacities were determined for the membrane of Example 23 and a commercial membrane composed of 20 weight percent glass microfiber and 80 weight percent cellulose fiber (Product No. OS-81-2630, Eaton-Dikeman Incorporated, Watertown, N.Y.). Both membranes were tested using the previously described aqueous Particulate Removal Efficiency Test. The dirt holding capacities of the test membranes were determined by challenging with the silicious test dust suspension until a pressure drop of 40 psi (2.82 kg/cm$^2$) developed across the membranes indicating the end of useful filter life. From the duration time of the test, the concentration of the silicious test dust and the flow rate of the test dust suspension, the apparent dirt holding capacities for each test membrane was calculated. The absolute particle removal rating at 99.95% efficiency was also determined for each membrane as previously described. The results from these tests are listed in Table IX-a below:

TABLE IX-a

| Membrane of Example | OSU F-2 Particulate Removal Ratings in Micrometers at 99.95% Efficiency | Dirt Holding Capacity (to 40 psi) in Grams Test Dust per Square Foot Membrane |
|---|---|---|
| 23 | 2 | 5.4 |
| Glass-Cellulose Fiber Filter | 2 | 0.75 |

The results listed in the above table demonstrate the greatly improved dirt filtering capacity of the membranes of this invention compared to prior art membranes containing cellulose fiber reinforcing aids. The data demonstrates that cellulose-containing membranes of substantially identical particle removal rating have greatly reduced dirt collecting capacities and shorter filter lifetimes compared to glass microfiber filter sheets of the present invention.

EXAMPLE 28b

The filter sheets of Example 22 and 23 and the control membrane of this Example were subjected to bubble point testing by the method well known to the industry. Such a test measures air flow rates through a filter sheet or membrane wetted by a liquid and yields useful information on the pore size characteristics of the filter sheet or membrane. When air flow per unit of applied pressure through a wetted filter sheet or membrane is plotted against increasing applied pressure, the initial flow is very small and constant until a sharp rise in flow occurs at the pressure required to displace the wetting liquid, e.g., water from the filter sheet or membrane pores. The applied pressure at which transition occurs is a measure of filter sheet or membrane pore size distribution and can be determined by the known capillary rise equation. Uniform pore media are characterized by a very sharp change in slope at the capillary displacement pressure while broad pore distribution filter sheets evidence a low rate of slope change indicative of the presence of pores with a range of diameters. The capillary displacement pressure range may be used to estimate pore diameter distribution by means of the capillary rise equation.

The results from these tests is listed in Table IX-b below:

TABLE IX-b

| Membrane | Calculated Pore Diameter Micrometers | |
|---|---|---|
| of Example | Mean | Range |
| 22 | 0.875 | 0.86 to 0.89 |
| 23 | 0.93 | 0.89 to 0.95 |
| Cellulose-Glass Fiber Filter | 1.75 | 1.4 to 2.1 |

This demonstrates that filter sheets or membranes of the present invention have narrower pore size distributions than a cellulose fiber reinforced glass filter sheet or membrane of the prior art.

EXAMPLE 29

Glass microfibers with a mean fiber diameter of 0.3 micrometers were converted to a cationic binder resin-coated microfiber dispersion by the method of Example 5. The dispersion was then formed into a filter sheet at a sheet weight of 4.3 grams per square foot and cured.

EXAMPLE 30

Glass microfibers with a mean fiber diameter of 0.3 micrometers were converted to a cationic binder resin-coated fiber dispersion by the method of Example 5. The fiber dispersion was then formed into a filter sheet at a sheet weight of 1.4 grams per square foot and cured.

The filter sheets of Examples 29 and 30 were evaluated for their ability to filter bacteria from aqueous suspensions. The filter sheets were challenged with the bacterium *Pseudomous diminuta* (which has the form of a rod 0.3 $\mu$m in diameter and 1 $\mu$m in length) in aqueous suspension near neutral pH according to the previously described Bacterial Titer Removal method. For comparative purposes, a filter sheet prepared with glass microfibers with substantially identical mean diameter, but not prepared by the method of this invention, is included in the test evaluation. This filter sheet is manufactured by Pall Corporation and sold under the trademark Ultipor GF® and is designated "Control" in these evaluations. The results obtained from these tests are set out in Table X.

TABLE X

| Filter Sheet of Example | Filter Sheet Weight, Grams Per Square Foot | *Pseudomonas diminuta* Challenge | |
|---|---|---|---|
| | | Total Challenge | Percent Removal |
| 29 | 4.3 | $1.7 \times 10^8$ | 99.9995% |
| | | $1.6 \times 10^9$ | 99.9998% |
| | | $1.6 \times 10^{10}$ | 99.9998% |
| 30 | 1.4 | $1.4 \times 10^8$ | 99.999% |
| | | $1.4 \times 10^9$ | 99.997% |
| | | $1.3 \times 10^{10}$ | 99% |
| Control | 1.5 | $1.5 \times 10^8$ | 92 |
| | | $1.4 \times 10^9$ | 72 |
| | | $9.9 \times 10^9$ | 47 |

The filter sheet of Example 30 was evaluated for its removal efficiency of the bacterium *Serratia marcescens*, which is 0.45 micrometers in diameter, from neutral aqueous suspension by the previously outlined Bacterial Titer Removal method. For comparative purposes, the prior art filter sheet designated as "Control" in the preceeding Table X was subjected to testing by the same method. The results of these evaluations are listed in Table XI.

TABLE XI

| Filter Sheet of Example # | Filter Sheet Weight Grams per Square Foot | *Serratia Marcescens* Challenge | |
|---|---|---|---|
| | | Total Challenge | Percent Removal |
| 30 | 1.4 | $5.6 \times 10^8$ | 99.999999% |
| Control | 1.5 | $6.0 \times 10^8$ | 99.9997% |

EXAMPLE 31

Glass microfibers with a mean fiber diameter of 0.61 micrometers were converted into a cationic binder resin-coated fiber dispersion by the method of Example 5. The fiber dispersion was then formed into a filter sheet at a sheet weight of 2.1 grams per square foot and cured. The membrane of this Example was tested for its removal efficiency of the bacterium *Serratia marcescens* from aqueous suspension at neutral pH. For comparative purposes, a prior art filter sheet prepared with glass microfibers of substantially the same mean fiber diameter was also tested and is designated as "Control" in Table XII.

TABLE XII

| Filter Sheet of Example | Filter Sheet Weight Grams per Square Foot | *Serratia Marcescens* Challenge | |
|---|---|---|---|
| | | Total Challenge | Percent Removal |
| 31 | 2.1 | $2.0 \times 10^6$ | 99.99995% |
| | | $1.7 \times 10^7$ | 99.9999% |
| | | $1.6 \times 10^8$ | 99.95% |
| Control | 2.0 | $2.0 \times 10^6$ | 52% |
| | | $1.7 \times 10^7$ | 44% |
| | | $1.6 \times 10^8$ | 55% |

A number of the filter sheets of the present invention were tested for their ability to remove endotoxin from aqueous suspension near neutral pH by the previously described Endotoxin Titer Reduction test method. *E. coli* endotoxin in aqueous solution was used to test the membranes of Examples 23, 29 and 30. *E coli* endotoxins are believed to be of molecular dimensions and consist of rod forms about 0.001 micrometers in diameter. For comparative purposes, the prior art filter sheet designated as "Control" in Table XI was included in the endotoxin removal efficiency testing. The results of these test evaluations are set out in Table XIII below.

TABLE XIII

| Filter Sheet of Example # | Filter Sheet Weight in Grams per Square Foot | Removal Efficiency for *E. Coli* Endotoxin |
| --- | --- | --- |
| 23 | 3.1 | 99.97% |
| 29 | 4.3 | 99.998% |
| 30 | 1.4 | 99.97% |
| Control | 1.5 | 90% |

EXAMPLE 32

On a glass plate was deposited a five weight percent aqueous solution of activated Resin R4308 in the form of a 0.005 to 0.010 inch thick film by means of spreading the film with a doctor blade. On a separate similar glass plate was spread a 0.005 to 0.010 inch thick film of 0.18 weight percent aqueous solution of Nalcolyte 7763. A one square foot (929 cm$^2$) piece of nonwoven polyester web, Reemay ® 2114 with a sheet weight of 30 grams per square meter, was contacted with the described Resin R4308, to apply the resin to the web, by laying the web onto the coated glass surface. The web was removed from the surface and then similarly placed onto the precipitating agent film with light hand pressure to assure even contact with the treating solution for applying the precipitating agent to the web. The binder resin coated web was then placed in the vacuum filter forming apparatus previously described and treated with the glass microfiber suspension of Example 4 at a microfiber sheet weight of 2 grams per square foot. The formed filter sheet was dried and cured for fifteen minutes at 125 degrees C. and was then ready for testing.

EXAMPLES 33-37

A number of substrate supported filter sheets were made by the procedure of Example 32 using the binder resin coated fiber suspension of Example 4. The variations in adhesive resin concentration an precipitating agent concentration of the solutions applied to the substrate web are listed in Table XIV below. The cured filter sheets of these examples were evaluated for the adhesion of the microfiber filter sheet to the substrate web by attempting to separate them at the adhesive interface manually. Cohesive failure at the bonding interface, as evidenced by glass microfibers adhering to the substrate web and the interface after separation of the layers, was considered acceptable adhesion and termed good to excellent, with the greater the quantity of adhering microfibers, the better the rating. The adhesion was termed poor if separation of the layers was accomplished without evidence of adhered microfibers remaining substantially bonded to the substrate web and is termed adhesive failure.

TABLE XIV

| Example # | Percent Resin Content in Web Treating Solutions | | Adhesion |
| --- | --- | --- | --- |
| | Resin R4308 | Nalcolyte 7763 | |
| 32 | 5% | 0.18 | Excellent |
| 33 | 5 | 0.14 | Excellent |
| 34 | 5 | 0.09 | Good |
| 35 | 4 | 0.18 | Good |
| 36 | 3 | 0.18 | Good |
| 37 | 5 | 0.07 | Poor |

The results in Table XIV show that substrate supported glass microfiber filter membranes with excellent adhesion to the substrate can be produced by the process of the present invention.

EXAMPLES 38 THROUGH 41

The process in Example 32 was repeated except that the binder resin treated glass microfiber dispersion of Example 5 was employed and the precipitating agent Carboset 531 was substituted for Nalcolyte 7763 in the substrate web treating step. The filter sheets were cured and tested for adhesion of the layers as described in Example 32 and the results are listed in the Table below.

TABLE XV

| Example # | Weight Percent Resin Content in Web Treating Solutions | | Adhesion |
| --- | --- | --- | --- |
| | Resin R4308 | Carboset 531 | |
| 38 | 5 | 2 | Excellent |
| 39 | 2 | 2 | Good |
| 40 | 5 | 1 | Poor |
| 41 | 1 | 1 | Fair |

The results listed in Table XV demonstrate that substrate supported glass microfiber filter sheets with excellent adhesion between the two layers result from the use of the precipitating agent Carboset 531 in the process of the present invention. The excellent adhesion exhibited by the filter sheets of these examples allows them to be converted by conventional equipment into accordion form, by means of corrugation, and incorporated into filter cartridges without fracturing or other loss in filtration property. These substrate supported microfiber filter sheets may also be used, without additional processing, for filtering applications requiring filter sheets of exceptional mechanical strength and fracture resistance.

Industrial Applicability

The greatly enhanced removal efficiencies for bacteria and endotoxins of the filter sheets of this invention, as opposed to prior art filter sheets, are clearly demonstrated in the preceding Examples. Their high removal efficiencies of particulates and certain large molecules from aqueous suspensions, outstanding strength with low resin content and relative ease of preparation have been demonstrated. They find use in industry and the medical field in the treatment of water supplies for critical applications such as water for injection into humans, in microelectronics manufacture, in filtration of blood serum to help achieve sterility, for filtration of parenterals, and generally for any use where an ion containing liquid is to be filtered to a high degree of clarity.

The suspensions prepared in these examples containing the glass fiber, the cationic binder resin and the precipitant are quite stable and may also be used as a filter aid, either as a precoat or as a precoat and body feed mixed with the liquid to be filtered.

We claim:

1. A filter sheet exhibiting a positive zeta potential over a pH range of from about 3 to about 10 comprising: a mat of inorganic microfibers normally having a negative zeta potential substantially uniformly coated with a cured, precipitated cationic thermosetting binder resin or polymer, said binder resin or polymer being present in an amount sufficient to impart said positive zeta potential to said filter sheet and to bond said microfibers together thereby imparting tensile strength to said filter sheet.

2. The filter sheet of claim 1 wherein said microfibers are selected from the group comprising glass microfibers, titanate microfibers, and mixtures thereof.

3. The filter sheet of claim 1 wherein said binder resin or polymer is selected from the group comprising epoxide-based resins, polyamido/polyamino-epichlorohydrin resins, and polyamine-epichlorohydrin resins.

4. The filter sheet of claim 1 wherein the weight ratio of said binder resin or polymer to said microfibers is in the range of from about 1:100 to about 40:100.

5. The filter sheet of claim 4 wherein the weight ratio of said binder resin or polymer to said microfibers is from about 5:100 to about 30:100.

6. The filter sheet of claim 1 wherein said filter sheet has actual pore sizes ranging from about 0.5 to about 50 micrometers.

7. The filter sheet of claim 1 wherein said filter sheet has a minimum tensile strength of about 0.4 pounds per inch.

8. The filter sheet of claim 7 wherein said filter sheet has a tensile strength of from about 0.4 to about 3 pounds per inch.

9. The filter sheet of claim 1 wherein said microfibers are staple fibers and have a mean diameter in the range of from about 0.1 to about 10 micrometers.

10. The filter sheet of claim 1 wherein the maximum pore size of said filter sheet is 20 micrometers or less.

11. The filter sheet of claim 1 further comprising a porous backing.

12. A method for the filtration of particulates from a fluid medium comprising passing said medium through the filter sheet of claim 1.

13. A filter sheet exhibiting a positive zeta potential in alkaline media consisting essentially of:
a mat of inorganic microfibers normally having a negative zeta potential substantially uniformly coated with a cured, precipitated, cationic thermosetting binder resin or polymer, said binder resin or polymer being present in an amount sufficient to impart said positive zeta potential to said filter sheet and to bond said microfibers together, thereby imparting tensile strength to said filter sheet.

14. The filter sheet of claim 13 wherein said microfibers are selected from the group comprising glass microfibers, titanate microfibers, and mixtures thereof.

15. The filter sheet of claim 13 wherein said binder resin or polymer is selected from the group comprising epoxide-based resins, polyamido/polyamino-epichlorohydrin resins, and polyamine-epichlorohydrin resins.

16. The filter sheet of claim 13 wherein the weight ratio of said binder resin or polymer to said microfibers is in the range of from about 1:100 to about 40:100.

17. The filter sheet of claim 1 wherein the weight ratio of said binder resin or polymer to said microfibers is from about 5:100 to about 30:100.

18. The filter sheet of claim 13 wherein said filter sheet has actual pore sizes ranging from about 0.5 to about 50 micrometers.

19. The filter sheet of claim 13 wherein said filter sheet has a minimum tensile strength of about 0.4 pounds per inch.

20. The filter sheet of claim 13 wherein said filter sheet has a tensile strength of from about 0.4 to about 3 pounds per inch.

21. The filter sheet of claim 13 wherein said microfibers are staple fibers and have a mean diameter in the range of from about 0.1 to about 10 micrometers.

22. The filter sheet of claim 13 wherein the maximum pore size of said filter sheet is 20 micrometers or less.

23. The filter sheet of claim 13 further comprising a porous backing.

24. A method for the filtration of particulates from a fluid medium comprising passing said medium through the filter sheet of claim 13.

25. The filter sheet of claim 11 wherein said porous backing is intimately adhered to said mat of inorganic microfibers.

26. The filter sheet of claim 23 wherein said porous backing is intimately adhered to said mat of inorganic microfibers.

* * * * *